United States Patent
Wang et al.

(10) Patent No.: US 8,781,014 B2
(45) Date of Patent: Jul. 15, 2014

(54) PHYSICAL LAYER CONVERGENCE PROTOCOL (PLCP) PACKET STRUCTURE FOR MULTIPLE-INPUT-MULTIPLE-OUTPUT (MIMO) COMMUNICATION SYSTEMS

(75) Inventors: Dong Wang, Ossining, NY (US); Jun Yang, Croton-on-Hudson, NY (US); Dagnachew Birru, Yorktown Heights, NY (US)

(73) Assignee: Koninklijke Philips N.V., Eindhoven (NL)

( * ) Notice: Subject to any disclaimer, the term of this patent is extended or adjusted under 35 U.S.C. 154(b) by 630 days.

(21) Appl. No.: 12/867,932

(22) PCT Filed: Mar. 9, 2009

(86) PCT No.: PCT/IB2009/050968
§ 371 (c)(1),
(2), (4) Date: Aug. 17, 2010

(87) PCT Pub. No.: WO2009/113005
PCT Pub. Date: Sep. 17, 2009

(65) Prior Publication Data
US 2010/0329366 A1    Dec. 30, 2010

Related U.S. Application Data

(60) Provisional application No. 61/035,144, filed on Mar. 10, 2008, provisional application No. 61/157,231, filed on Mar. 4, 2009.

(51) Int. Cl.
*H04B 7/02* (2006.01)
*H04L 1/02* (2006.01)

(52) U.S. Cl.
USPC ............ 375/267; 375/206; 375/299; 375/347

(58) Field of Classification Search
USPC .................. 375/267, 299, 347, 340, 356, 206
See application file for complete search history.

(56) References Cited

U.S. PATENT DOCUMENTS

| | | | |
|---|---|---|---|
| 2005/0078598 A1* | 4/2005 | Batra et al. | 370/206 |
| 2005/0276347 A1* | 12/2005 | Mujtaba et al. | 375/299 |
| 2005/0281241 A1 | 12/2005 | Webster | |
| 2006/0159058 A1 | 7/2006 | Johnson | |

(Continued)

FOREIGN PATENT DOCUMENTS

GB    2444999 A    6/2008

OTHER PUBLICATIONS

Charles Razzell et al: "Approaches and Considerations for Evolution of OFDM-based UWB PHY Solutions beyond IGbps" Ultra-Wideband, 2007. ICUWB 2007. IEEE International Conference On, IEEE, PI, Sep. 1, 2007, pp. 405-410, XP031159384.

(Continued)

*Primary Examiner* — Qutbuddin Ghulamali
(74) *Attorney, Agent, or Firm* — Larry Liberchuk (57) ABSTRACT

A physical layer convergence protocol (PLCP) data structure transmitted in a multiple-input-multiple-output (MIMO) communication system. The PLCP data structure comprises a legacy portion including a legacy preamble and a legacy header, wherein the legacy preamble and the legacy header carry information compliant with at least a WiMedia standard; and a high throughput (HT) portion including a HT preamble and a HT header, and wherein the HT preamble carries information enabling a receiver of the MIMO communication system to decode received signals.

5 Claims, 6 Drawing Sheets

(56) References Cited

U.S. PATENT DOCUMENTS

2006/0182017 A1\* 8/2006 Hansen et al. ............... 370/208
2007/0097946 A1 5/2007 Mujtaba
2007/0280173 A1 12/2007 Jo
2008/0175332 A1\* 7/2008 Coon ............................ 375/267
2011/0142023 A1\* 6/2011 Aoki et al. .................... 370/338

OTHER PUBLICATIONS

Jun Yang et al: "Design and Performance of Multi-Band OFDM UWB System with Multiple Antennas" IEEE International Symposium on Personal, Indoor and Mobile Radio Communications. PIMRC, IEEE; PI, XX, Sep. 1, 2007, pp. 1-5, XP031168783.

\* cited by examiner

PHYSICAL LAYER CONVERGENCE PROTOCOL (PLCP) PACKET STRUCTURE FOR MULTIPLE-INPUT-MULTIPLE-OUTPUT (MIMO) COMMUNICATION SYSTEMS

This application claims the benefit of U.S. Provisional Application No. 61/035,144 filed on Mar. 10, 2008 and U.S. Provisional Application No. 61/157,231 filed on Mar. 4, 2009.

The invention relates generally to multiple-input-multiple-output (MIMO) communication systems, and more particularly to preamble structures for MIMO communication systems.

The WiMedia standard defines the specifications of a media access control (MAC) layer and a physical (PHY) layer based on multi-band orthogonal frequency division modulation (MB-OFDM) transmissions. The WiMedia standard enables short-range multimedia file transfers at rates of up to 480 Mbps with low power consumption. The standard operates in a frequency band between 3.1 GHz and 10.6 GHz of the ultra-wideband (UWB) spectrum. However, the highest data rate of the WiMedia standard rate cannot meet future wireless multimedia applications, such as HDTV wireless connectivity. An effort is being made to increase the data rates to 1 Gpbs and above.

To this end, a multiple-input-multiple-output (MIMO) technique is being considered for future WiMedia based wireless communication systems. The MIMO technology provides better diversity gain and can significantly increase the channel capacity under rich scattering scenarios. The MIMO technology has been successfully adopted in wireless systems including, for example, 802.11n based wireless local area networks (WLANs) and WiMax. The MIMO is also considered to be implemented in the next generation WiMedia based systems.

Figure 1:
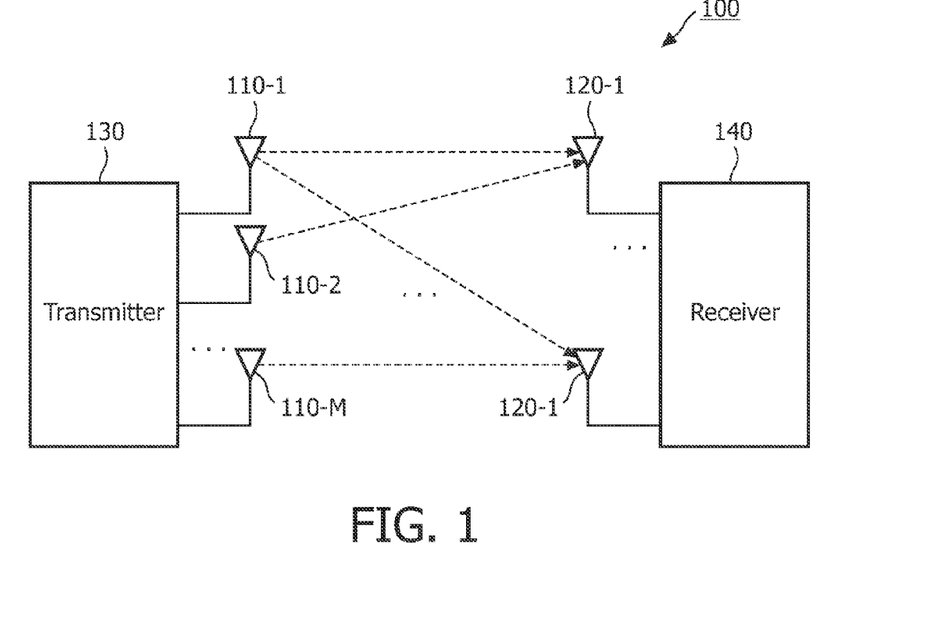
FIG. 1 is a schematic diagram of a MIMO based system.

FIG. 1 shows a schematic diagram of a MIMO based system 100 in which a transmitter 130 includes M transmit antennas 110-1 through 110-M and a receiver 140 receives signals using N receive antennas 120-1 through 120-N. Typically, in a single-input-single-output (SISO) system, the receiver estimates only a scalar channel parameter 'h'. That is, the channel estimation is performed by a receiver using a preamble transmitted by a transmit antenna. On the other hand, in the MIMO system 100 the receive antenna 120-X (where X is an integer equal to or greater than one) should estimate an M by N channel matrix H:

$$H = \begin{matrix} h(1,1) & h(1,2) & \ldots & h(1,N) \\ h(2,2) & h(2,1) & \ldots & \ldots \\ \ldots & \ldots & \ldots & \ldots \\ \ldots & \ldots & \ldots & \ldots \\ h(M,1) & h(M,2) & \ldots & h(M,N) \end{matrix}$$

Figure 2:
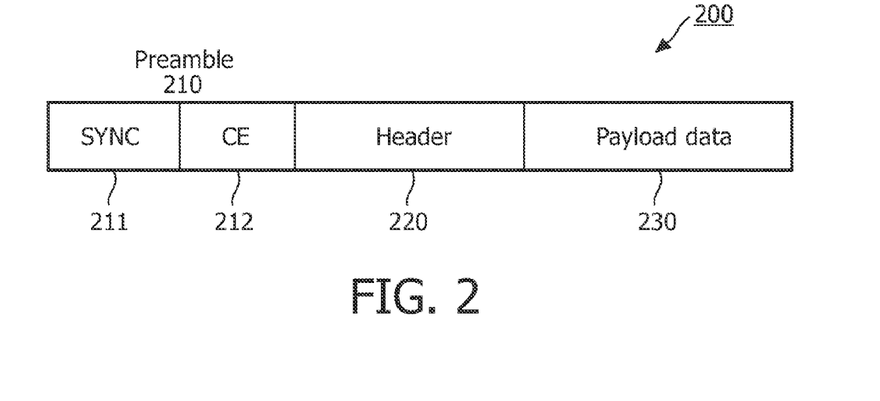
FIG. 2 is a diagram of a physical layer convergence protocol (PLCP) packet constructed according to the WiMedia standard.

FIG. 2 shows a physical layer convergence protocol (PLOP) packet 200, which is a physical layer packet utilized in SISO based UWB communication systems. The PLOP packet 200 includes a preamble 210, a header 220 and a payload data 230. The preamble 210 allows a receiver to perform the tasks of packet detection, automatic gain control (AGC) adjustment, synchronization (e.g., timing acquisition and carrier frequency offset estimation), and channel estimation. With this aim, the preamble 210 includes two portions: synchronization (SYNC) 211 and channel estimation (CE) 212. The synchronization portion 211 includes time domain random sequences of OFDM symbols with a repetition structure. These sequences have a good autocorrelation property and enable a UWB receiver to perform packet and timing synchronization detection using correlation-based methods. The random sequences can also be utilized for performing AGC and frequency offset estimation. In addition, the time domain sequences are optimized to satisfy FCC power spectral density mask requirements. The channel estimation portion 212 includes training symbols enabling a receiver to estimate a channel parameter 'h' for each subcarrier.

The PLOP packet 200 cannot be used directly for future MIMO based UWB communication systems. This is due to the fact that a MIMO based systems require more channel estimation symbols, since more channel parameters are needed to be estimated. In addition, more than one antenna 110-X transmits simultaneously payload data 230, whereby the synchronization portion 211 should be modified to allow fine AGC adjustment.

Therefore, in order to support MIMO in future MIMO based UWB systems, there is a need to define a new PLOP packet structure to meet at least the requirements above. Additionally, the new PLOP packet should be backward compatible with current and/or previous versions of the WiMedia standards. The PLOP packet should also guarantee that a signal transmitted from multiple transmit antennas satisfies FCC power spectral mask requirements. Yet, the overload of the PLOP packet should be as low as possible in order not to degrade the systems' performance.

Certain embodiments of the invention include a physical layer convergence protocol (PLOP) data structure transmitted in a multiple-input-multiple-output (MIMO) communication system. The PLCP data structure comprises a legacy portion including a legacy preamble and a legacy header, wherein the legacy preamble and the legacy header carry information compliant with at least a WiMedia standard; and a high throughput (HT) portion including a HT preamble and a HT header, wherein the HT preamble carries information enabling a receiver of the MIMO communication system to decode received signals.

Certain embodiments of the invention include a method for transmitting data in a multiple-input-multiple-output (MIMO) communication system having multiple transmit antennas and having multiple receive antennas. The method includes generating a PLCP data structure comprising a legacy portion for carrying information compliant with at least a WiMedia standard, a high throughput (HT) portion and a data portion; transmitting from a first transmit antenna the PLCP data structure; and transmitting from the multiple transmit antennas, excluding the first transmit antenna, the HT portion and the data portion of the PLCP data structure.

Certain embodiments of the invention include a method for transmitting data in a multiple-input-multiple-output (MIMO) communication system having multiple transmit antennas and having multiple receive antennas. The method includes generating a PLCP data structure (300) comprising a legacy portion for carrying information compliant with at least a WiMedia standard, a high throughput (HT) portion and a data portion; and transmitting the PLCP data structure from the multiple transmit antennas, wherein each transmit antenna transmits a cyclically shifted version of the legacy portion.

Certain embodiments of the invention include a physical layer convergence protocol (PLOP) data structure to be transmitted in a multiple-input-multiple-output (MIMO) communication system. The PLOP comprises a legacy portion including a legacy preamble and a legacy header, wherein the legacy preamble and the legacy header carry information compliant with at least a WiMedia standard; and a high throughput (HT) portion including a HT channel estimation (CE) preamble and a HT header, wherein the HT CE preamble carries frequency domain sequences for estimating channel effects of signals transmitted by all multiple transmit antennas.

Certain embodiments of the invention include a method for transmitting data in a multiple-input-multiple-output (MIMO) communication system having multiple transmit antennas and having multiple receive antennas. The method comprises generating a PLCP data structure comprising a legacy portion for carrying information compliant with at least a WiMedia standard, a high throughput (HT) channel estimation (CE) preamble and a HT header portion and a payload data portion; and transmitting the PLCP data structure from the multiple transmit antennas.

The subject matter that is regarded as the invention is particularly pointed out and distinctly claimed in the claims at the conclusion of the specification. The foregoing and other features and advantages of the invention will be apparent from the following detailed description taken in conjunction with the accompanying drawings.

It is important to note that the embodiments disclosed by the invention are only examples of the many advantageous uses of the innovative teachings herein. In general, statements made in the specification of the present application do not necessarily limit any of the various claimed inventions. Moreover, some statements may apply to some inventive features but not to others. In general, unless otherwise indicated, singular elements may be in plural and vice versa with no loss of generality. In the drawings, like numerals refer to like parts through several views.

Figure 3:
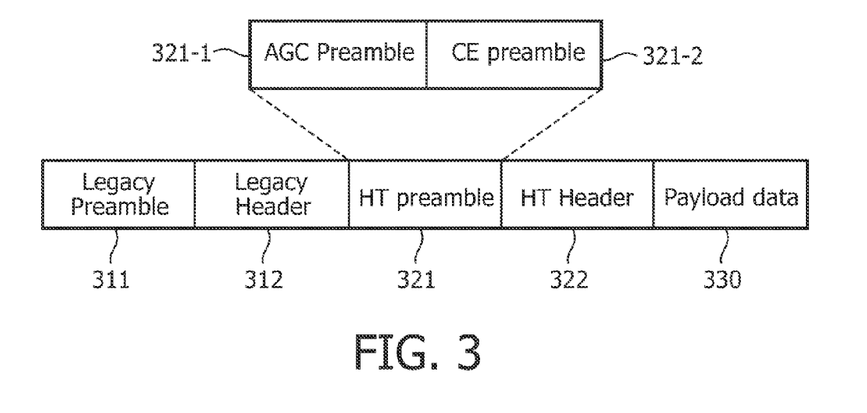
FIG. 3 is a diagram of a PLCP packet data structure constructed in accordance with an embodiment of the invention.

FIG. 3 shows an exemplary and non-limiting diagram of a physical layer convergence protocol (PLOP) packet 300 constructed in accordance with an embodiment of the invention. The PLOP packet 300 is a data structure including a legacy preamble 311 and a legacy header 312, a high-throughput (HT) preamble 321 and a HT header 322, as well as a payload data portion 330. In comparison to the PLOP packet 200 a new preamble (321) and header (322) are added in the PLOP packet 300. The structure of the PLOP 300 will be described with reference to a MIMO based communication system shown in FIG. 1.

In a preferred embodiment, the legacy preamble 311 and header 312 are transmitted only through the first transmit antenna 110-1 to carry information as included in a standard PLOP preamble 210 and header 220, respectively. In a preferred embodiment, the legacy preamble 311 and legacy header 312 are as defined in the WiMedia standard version 1.0. This allows MIMO-based UWB systems to perform the tasks of packet detection, AGC control, timing synchronization, frequency offset estimation, and channel estimation to decode header information. The AGC control and the channel estimation are performed only for the channel transmitting the legacy preamble 311 and legacy header 312. Furthermore, since only one transmit antenna 110-1 transmits this information, the FCC power spectral mask is satisfied.

To allow AGC and channel estimation of other channels, the HT preamble 321 includes an AGC preamble 321-1 and a channel estimation (CE) preamble 321-2 (see FIG. 3). Each transmit antenna 110-X (where X is an integer greater than or equal to one) transmits a different AGC preamble 321-1, and all transmit antennas 110-1 through 110-M transmit their own AGC preambles 321-1 at the same time. In order to acquire a precise AGC adjustment, the AGC preambles 321-1 from different transmit antennas 110-X should be uncorrelated. With this aim, the content of the AGC preambles 321-1 is determined using a "tone distributing" process. In a preferred embodiment, the AGC preamble 321-1 includes a short preamble having six OFDM symbols.

Figure 4:
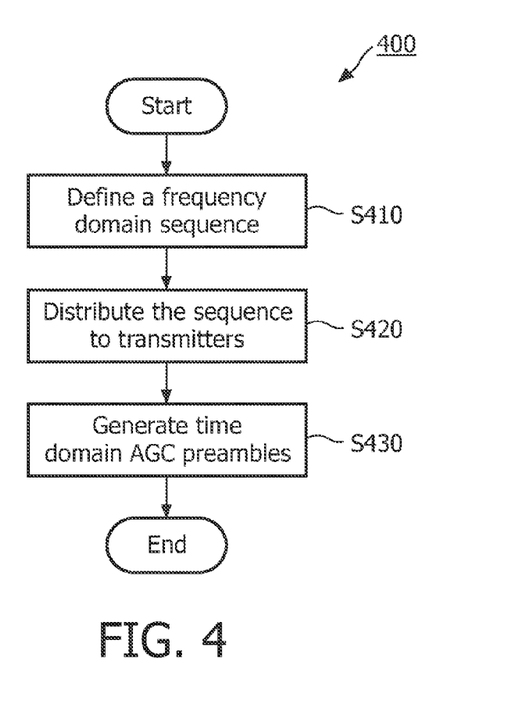
FIG. 4 is a flowchart describing a tone distributing process implemented in accordance with an embodiment of the invention.

FIG. 4 shows an exemplary and non-limiting flowchart 400 describing the tone distributing process implemented in accordance with an embodiment of the invention. At S410 a frequency domain sequence that includes a number of $N_{FFT}$ symbols is defined, which can be the same as the corresponding frequency domain sequence of one of the preamble sequences defined in the WiMedia standard version v1.0. The parameter $N_{FFT}$ is the number of subcarriers in an OFDM symbol. Non-zero symbols from a QPSK constellation can be elected for this purpose to guarantee a flat power spectrum. At S420, the frequency domain sequence is distributed to transmit antennas 110-1 through 110-M. At S430, for each transmit antenna 110-X its time-domain sequence to be included in the respective AGC preamble 321-1 is generated. Specifically, a time domain AGC preamble ($T_x$) to be transmitted by a transmit antenna 110-X is generated as follows:

$$T_X = IFFT(F_X) \quad (1)$$

$$F_X(k) = \begin{cases} S(k), & k = X, M+X, \\ & 2M+X, \ldots, N_{FFT}-M+X \\ 0, & \text{otherwise} \end{cases}$$

where, S(k) is the value of the frequency domain at subcarrier k, $F_X(k)$ is a respective frequency domain preamble of the transmit antenna 110-X, and $IFFT(F_X)$ is an inverse fast Fourier transform.

Figure 5:
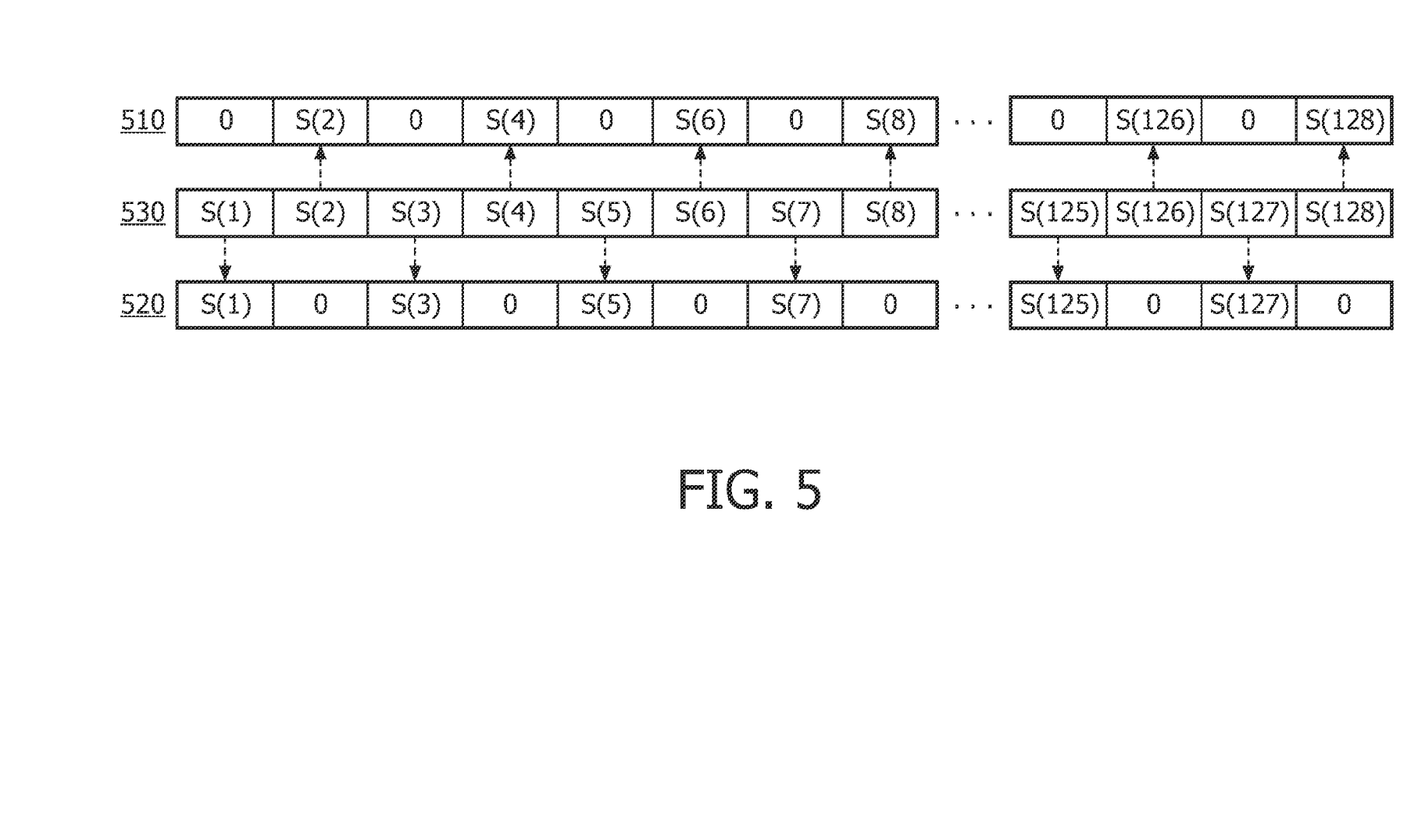
FIG. 5 illustrates AGC preambles generated using the tone distributing process.
Figure 6:
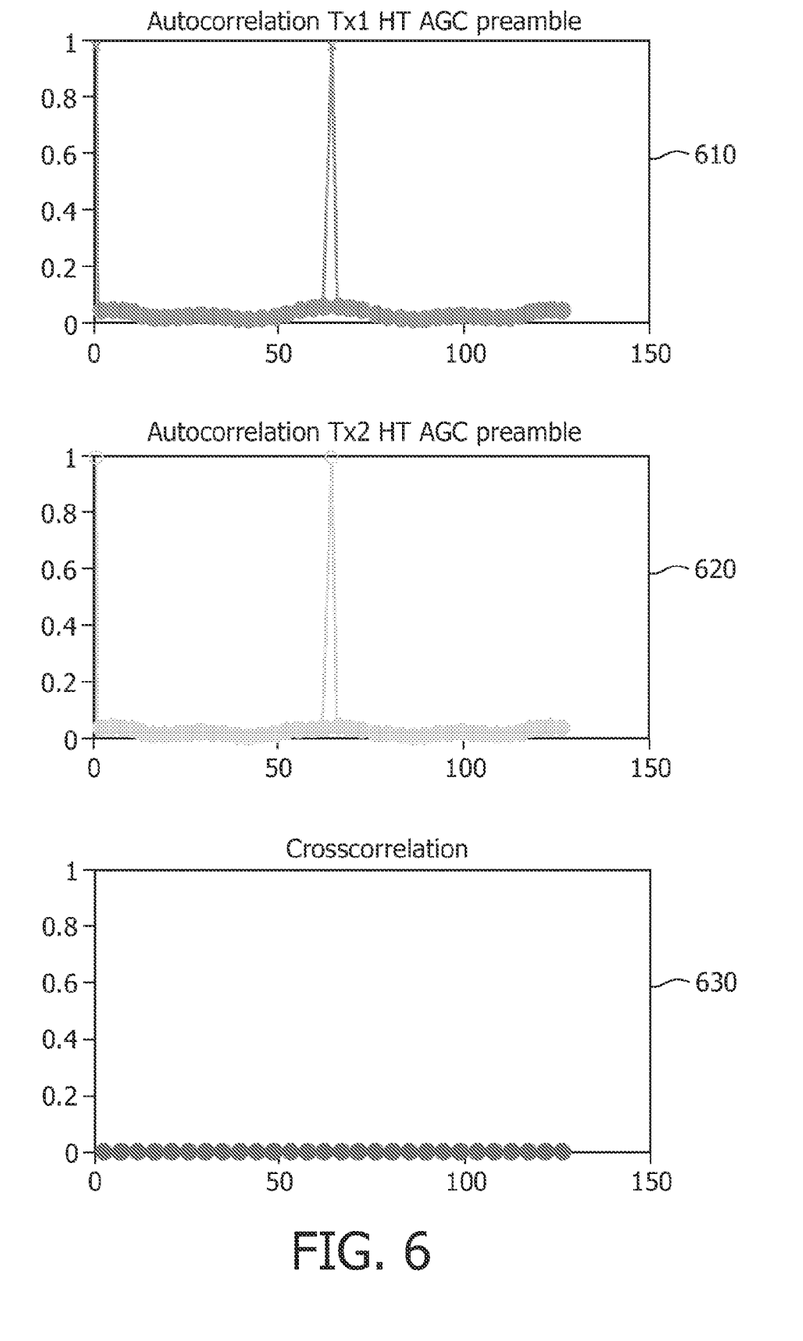
FIG. 6 illustrates autocorrelation and cross-correlation simulation graphs of AGC preambles.

A non-limiting example illustrating the operation of the tone distributing process is provided in FIG. 5. Preambles 510 and 520 are generated using the frequency domain sequence 530. As can be noticed, the values of the subcarriers alternate between zero and S(k). In this example, the transmit antennas 110-1 and 110-2 transmit the preambles 510 and 520 through different subcarriers. Thus, the respective time domain AGC preambles 510 and 520 are uncorrelated. This is further illustrated in FIG. 6, which shows autocorrelation simulation results of the time domain AGC preambles 510 and 520 in graphs 610 and 620, respectively, and their cross-correction in graph 630. As can be noticed, the cross-correction signal (i.e., the measure of similarity of the two signals) is zero.

The CE preamble 321-2 is constructed in such way that the preambles generated by different transmit antennas 110-X are orthogonal. This ensures that the different channels can be separately estimated. Specifically, each transmit antenna 110-X transmits M different CE preambles 321-2 during M different time periods. The M different CE preambles 321-2 are generated using the tone distributing processing, wherein the time domain preamble Di,j transmitted by a transmit antenna 110-i during a time period j is determined as follows:

$$D_{i,j}(k) = \begin{cases} S(k), & k \in \Omega_a \\ 0, & \text{otherwise} \end{cases} \quad (2)$$

$$a = \text{mod}(i+j-2, M) + 1$$

$$C_{i,j} = IFFT(D_{i,j})$$

where, $\Omega_a$, a=1,2, ... M are index sets, each of which has $$\frac{N_{FFT}}{M}$$

elements and $\Omega_i \cap \Omega_j = \{\ \}$ and $\Omega_1 \cup \Omega_2 \ldots \cup \Omega_M = \{1, 2, \ldots, N_{FFT}\}$, Ci,j is the respective frequency domain preamble and S is the frequency domain sequence. The index sets can be generated randomly. In one embodiment the index sets may be:

$$\Omega_a = \{a, a+M, a+2M, a+N_{FFT}-M\}$$

In a preferred embodiment, the number of OFDM symbols in a CE preamble 321-1 is six for the case where M equals 2.

Figure 7:
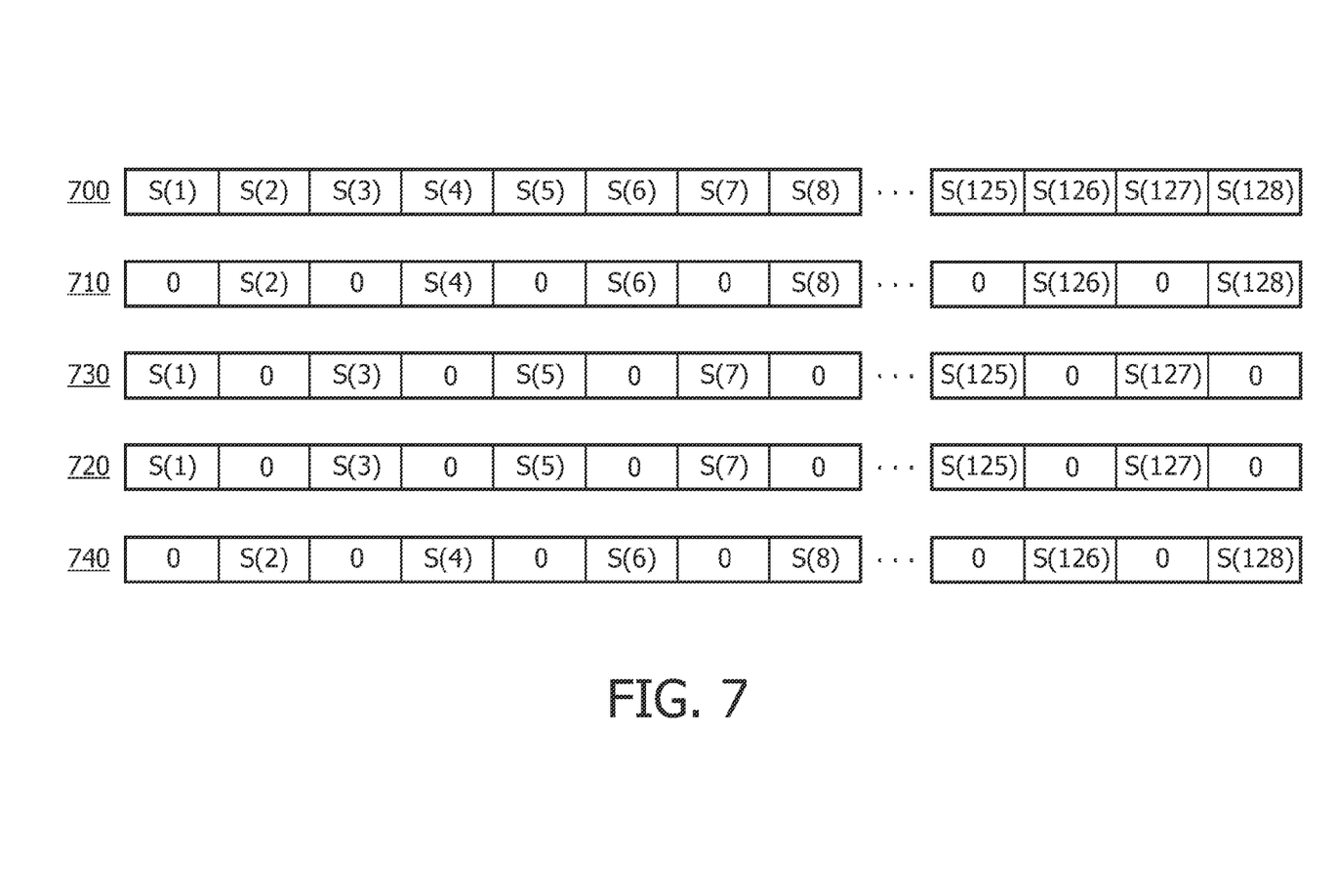
FIG. 7 illustrates CE preambles generated using the tone distributing process.

FIG. 7 illustrates 4 CE preambles 710, 720, 730 and 740 generated from a frequency domain sequence 750 using the tone distributing process. In this example, an OFDM symbol includes 128 subcarriers. As can be noticed, every transmit antenna 110-X transmits a signal on all subcarriers only once during M time periods. In addition, during each time period only one transmit antenna 110-X transmits signals on a subcarrier. This enables estimation of the channel.

In accordance with another embodiment of the invention, the legacy preamble 311 and legacy header 312 can be transmitted by all transmit antennas 110-1 through 110-M using a cyclic delay diversity (CDD) scheme. Specifically, the transmit antenna 110-1 transmits the original content of the legacy preamble 311 and legacy header 312, while the transmit antennas 110-2 through 110-M send cyclically shifted version of the legacy preamble 311 and legacy header 312. It should be noted that the OFDM symbols (time domain sequences) included in the HT preamble 321 are generated using the tone distributing process. These sequences can be further utilized for packet detection and timing synchronization using conventional correlation based methods, such that the legacy preamble 311 is backward compatible.

Figure 8:
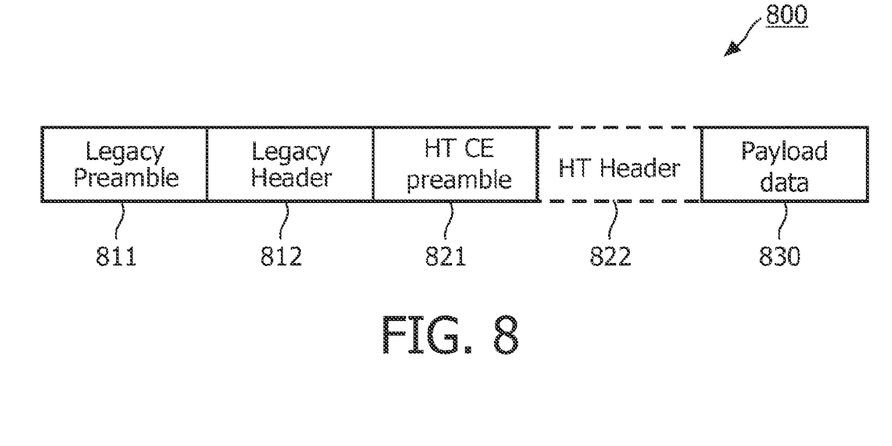
FIG. 8 is a PLOP packet constructed in accordance with another embodiment of the invention.

FIG. 8 shows an exemplary and non-limiting diagram of a physical layer convergence protocol (PLCP) packet 800 constructed in accordance with an embodiment of the invention. The PLCP packet 800 is a data structure including a legacy preamble 811 and a legacy header 812, a HT channel estimate (CE) preamble 821 and a HT header 822, as well as a payload data portion 830. In comparison to the PLCP packet 300, the PLCP packet 800 does not include the AGC preamble 321-1. The PLCP packet 800 is transmitted by all transmit antennas 110-1 through 110-M, where the legacy preamble 811 and legacy header 812 are generated using the tone distributing process, wherein the time domain sequences of the preamble are defined using equation (2), with j=1. This guarantees that the transmitted time domain sequences are not correlated. Furthermore, a precise MIMO AGC adjustment can be achieved based on the legacy preamble 811.

The HT CE preamble 821 includes frequency domain sequences for estimating only channels 2 through M. The first channel is estimated using the legacy preamble 811. Therefore, the total extra preamble overload is reduced to 6(M-1) OFDM symbols. For example, the total extra overhead for a MIMO based UWB system, including two transmit antennas, is only 6 OFDM symbols. The HT CE preamble 821 is transmitted during M-1 time periods, and the channel estimation preamble Di,j as defined in equation (2) is transmitted within the i-th (i=2, ..., M) period via the j-th antenna. S(k) is the frequency domain channel estimation sequence, which can be same as the channel estimation sequence defined, for example, in the WiMedia standard version v1.0. It should be noted that different design of the index sets $\Omega_a$, a=1, 2, ... M can result in different timing synchronization performance and can be optimized to improve the synchronization performance of legacy devices.

The foregoing detailed description has set forth a few of the many forms that the invention can take. It is intended that the foregoing detailed description be understood as an illustration of selected forms that the invention can take and not as a limitation to the definition of the invention. It is only the claims, including all equivalents that are intended to define the scope of this invention.

Most preferably, the principles of the invention are implemented as a combination of hardware, firmware and software. Moreover, the software is preferably implemented as an application program tangibly embodied on a program storage unit or computer readable medium. The application program may be uploaded to, and executed by, a machine comprising any suitable architecture. Preferably, the machine is implemented on a computer platform having hardware such as one or more central processing units ("CPU"), a memory, and input/output interfaces. The computer platform may also include an operating system and microinstruction code. The various processes and functions described herein may be either part of the microinstruction code or part of the application program, or any combination thereof, which may be executed by a CPU, whether or not such computer or processor is explicitly shown. In addition, various other peripheral units may be connected to the computer platform such as an additional data storage unit and a printing unit.

What we claim is:

1. A communication device for transmitting a physical layer convergence protocol (PLCP) data structure in a multiple-input-multiple-output (MIMO) communication system, the communication device comprising:
   at least one antenna for transmitting the PLCP data structure, and
   a processor for generating the PLCP data structure,
   wherein the PLCP data structure comprises a legacy portion including a legacy preamble and a legacy header, the legacy preamble and the legacy header being configured to carry information for a WiMedia based network; and a high throughput (HT) portion including a HT preamble and a HT header, the HT preamble being configured to carry information enabling a receiver of the MIMO communication system to decode received signals and include an automatic gain control (AGC) preamble and a channel estimation (CE) preamble, and
   wherein the AGC preamble is determined by a tone distributing process, the tone distributing process comprising:
      determining a frequency domain sequence;
      distributing the frequency domain sequence to multiple transmit antennas of the MIMO system; and
      for each transmit antenna, generating a time domain sequence to be included in the respective AGC preamble.

2. The communication device of claim 1, wherein the legacy portion is transmitted from a first transmit antenna of the MIMO system.

3. The communication device of claim 1, wherein content of the CE preamble is determined by the tone distributing process.

4. The communication device of claim 3, wherein different time domain sequences and frequency domain sequences are utilized to generate the CE preamble and the AGC preamble.

5. A method for transmitting data in a multiple-input-multiple-output (MIMO) communication system having multiple transmit antennas and having multiple receive antennas, comprising:
   generating a PLCP data structure comprising a legacy portion for carrying information for a WiMedia based network, a high throughput (HT) portion and a payload data portion, the HT portion including an HT preamble and an HT header, the HT preamble carrying information enabling a receiver of the MIMO communication system to decode received signals, said information including an automatic gain control (AGC) preamble and a channel estimation (CE) preamble, the AGC preamble being determined by a tone distributing process; and
   transmitting the PLCP data structure from the multiple transmit antennas, wherein each transmit antenna transmits a cyclically shifted version of the legacy portion;
   wherein the tone distributing process comprises:
      determining a frequency domain sequence;
      distributing the frequency domain sequence to the multiple transmit antennas of the MIMO system; and
      for each transmit antenna, generating a time domain sequence to be included in the respective AGC preamble.

* * * * *